April 14, 1942.  H. S. COE  2,279,970
THICKENING APPARATUS
Filed Jan. 24, 1940  2 Sheets-Sheet 1
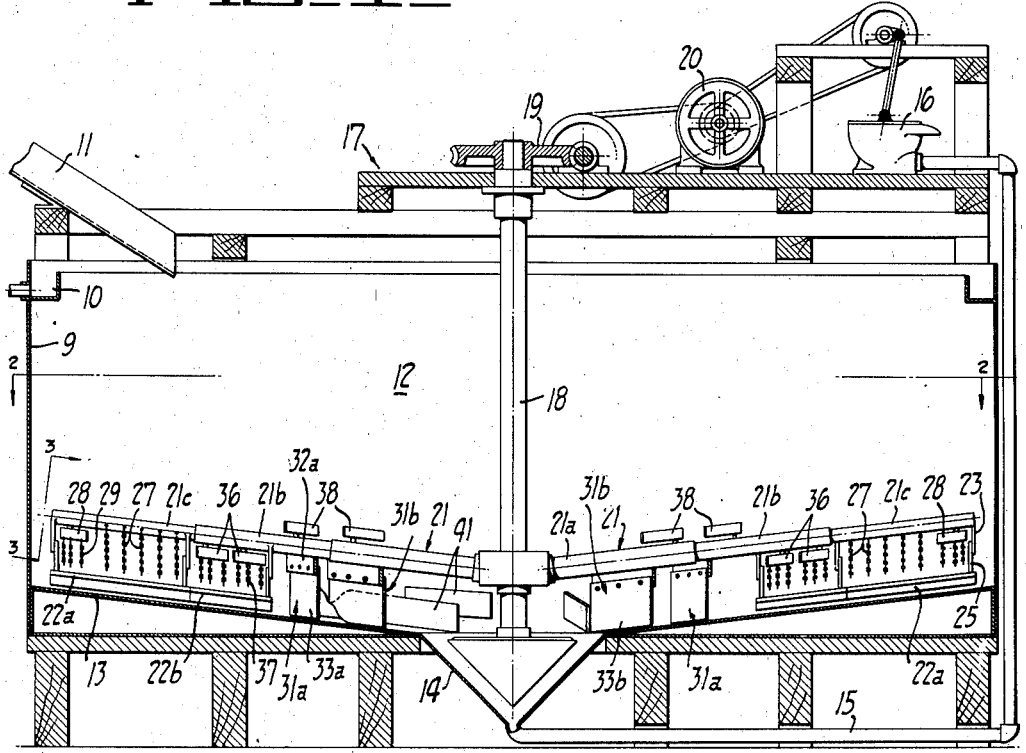
FIG_1_
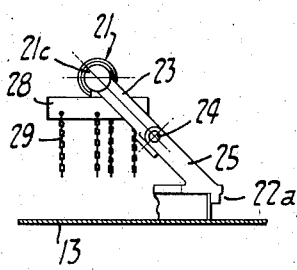
FIG_3_
INVENTOR
Harrison S. Coe
BY Paul D. Feeler
ATTORNEY April 14, 1942.   H. S. COE   2,279,970
THICKENING APPARATUS
Filed Jan. 24, 1940   2 Sheets-Sheet 2
FIG_2_
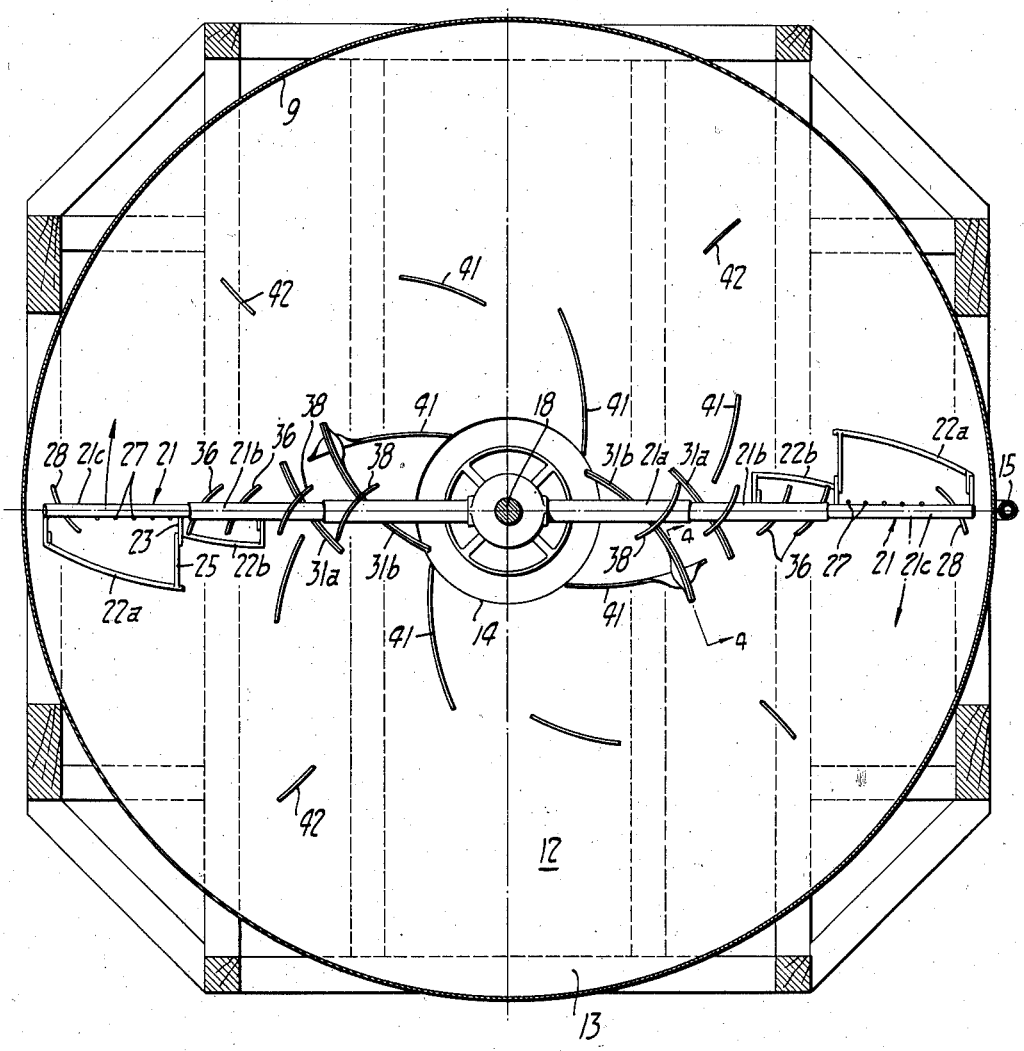
FIG_4_
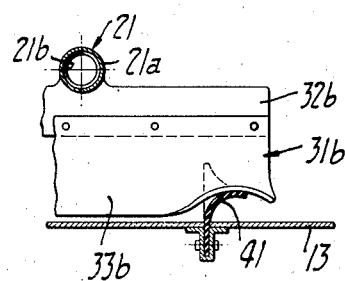
INVENTOR
Harrison S. Coe
BY
ATTORNEY Patented Apr. 14, 1942

2,279,970

UNITED STATES PATENT OFFICE 2,279,970

THICKENING APPARATUS

Harrison S. Coe, Palo Alto, Calif.

Application January 24, 1940, Serial No. 315,321

9 Claims. (Cl. 210—55)

This invention relates generally to thickening or settling apparatus such as are employed with various pulps or liquid materials containing suspended solids, as for example various metallurgical pulps containing ore solids.

The invention relates particularly to thickening or settling apparatus making use of a settling tank or chamber having a central opening through its bottom wall for the withdrawal of thickened material, and also having a rotatable stirring means serving to urge settled solids towards the discharge.

It is a general object of the invention to improve upon the effective capacity and efficiency of equipment of the above character.

Another object of the invention is to improve upon the rotary stirring and scraping means utilized in such apparatus, whereby material in a lower zone of the settling chamber is treated to secure optimum dewatering of the underflow, and whereby the manner in which the thickened material in a lower zone of the chamber is acted upon and progressed towards the central discharge opening, makes for high efficiency of operation.

A further object of the invention is to provide a simplified type of supporting structure for the stirring and scraping elements, whereby the supporting structure will have a minimum effect in tending to cause free rotary motion of material in the tank. In this connection the invention is characterized by the use of relatively light and tapered arms extending outwardly from the vertical operating shaft and which require no additional bracing.

Another object of my invention is to provide novel means tending to promote an outward circulation of thickening material from the inward areas of the settling chamber which outward movement carries the material from inner and more stagnant zones in the chamber to outer zones where more efficient stirring action exists. In this connection the invention is characterized by outwardly acting impelling members mounted on a supporting structure and disposed in a zone above that traversed by the inwardly scraping members in the chamber.

Another object of the invention is to provide novel means tending to prevent free rotary motion in the lower portion of the chamber, which rotary motion is detrimental to efficient removal of material from the lower settling zones in the chamber. In this connection the invention is characterized by baffle means mounted upon the bottom wall of the settling or thickening chamber, which act to impede rotary motion of the material undergoing treatment, and which may be placed directly in the path of certain of the stirring and scraping elements.

Referring to the drawings—

Figure 1 is a side elevational view, in cross section, illustrating a thickening apparatus incorporating the present invention and adapted for use with various pulps;

Figure 2 is a plan view of the apparatus shown in Figure 1;

Figure 3 is an enlarged detail illustrating the construction of certain of the stirring elements; and Figure 4 is an enlarged detail illustrating the construction of one of the baffles and the manner in which the same may cooperate with a scraping element.

The apparatus illustrated in the drawings consists of a tank 9, which in this instance is circular in contour, and which has its periphery provided with the overflow launder 10. A feed launder 11 serves as means to introduce the pulp or other material to be treated into chamber 12. The bottom wall 13 is sloped towards the center, where thickened material is withdrawn through the conical shaped opening 14 and the discharge pipe 15. Pipe 15 is shown connected to suitable pumping means such as the diaphragm pump 16. Journaled upon the supporting structure 17, there is a vertical rotatable shaft 18, which is driven by suitable means such as gearing 19 and motor 20. This shaft carries the stirring means for treating and urging settled material toward the discharge 14.

The stirring and scraping means attached to the shaft 18 has several novel features, and in general is adapted for optimum progression of material toward the outlet 14 without such agitation as to interfere with settlement of solids and with a minimum strain on the supporting arms and shaft. Also, elements of the stirring means effect a treatment of material immediately above the bottom wall 13 of the tank to secure optimum dewatering of settled material. Instead of utilizing structural arms provided with elaborate bracing as has been common in the past, I employ simple arms 21 which extend outwardly from the shaft 18 at a substantial elevation above the bottom wall 13. Each arm is preferably made buoyant, whereby it is relieved of a substantial amount of strain to which it would otherwise be subjected. For example, I can form each arm from several sections 21a, 21b and 21c of steel tubing of different diameters, telescopically engaged and welded together to form a rigid arm sealed at its ends to secure the desired buoyancy. Such tubular arms form tapered cantilever members which require no bracing.

Instead of making use of the customary close connection between the supporting arms and scraper blades arranged to urge material inward, I have provided spacing members 23 and 25 whereby the blades 22a and 22b in the outer region of the chamber are positioned at a substantial distance below their supporting arms.

The outer blade, or scraper, elements 22a and 22b which, in this construction, apply a relatively small rotating impulse to the thickened material in their zone of operation may preferably be formed of simple straps of iron, and under quite prevalent conditions may be made relatively short in vertical extension and set more nearly parallel to their supporting arms than is the case in conventional thickeners.

Figure 3 illustrates how the elements 22a and 22b can be supported to permit them to pass an obstruction. In this instance a supporting arm 23 extends in a downward direction from the arm 21 and has a pivotal connection 24 to the lower arm 25. The lower arm 25 connects to one end of a stirring element 22a.

In the region of operation of stirring elements 22a, I also preferably provide additional stirring elements adapted to gently agitate settled material. Thus, I have shown a series of chains 27 attached to the arms 21 and drooping downwardly above the zone of operation of the elements 22a. Also, I have shown blades 28 attached to the arms near their outer ends and carrying a plurality of chains 29. Blades 28 can be set at an angle as shown in Figure 1 in order to aid progression of settling material toward the central region of the tank.

Inwardly of the operation of scraping elements 22a and 22b, where the stirring action of the arms and their connected members, being slower, does not promote a fluidity of thickened pulp in a degree conducive of its selective gravitational flow from the lower regions in the chamber to the outlet, I have provided deeper and more positively impelling, scraping blades 31a and 31b.

The blades can be concave in the direction of advancement, as illustrated. Instead of using conventional rigid blades, I preferably make use of blades consisting in part of rubber strips or flaps extending downwardly to the bottom of the tank. Thus, each blade 31a consists of a rigid upper portion 32a, to which the resilient rubber strip 33a is attached. The rubber strip 33a has sufficient rigidity against bending to properly act against and move settled material inwardly. At the same time, it has sufficient resilience to pass an obstruction, or to cooperate with stationary baffles or vanes, as will be presently described.

In addition to the stirring means just described, I preferably utilize supplemental means carried by the arms for treatment of the settling material, in order to aid in securing a highly dewatered discharge. The means in this instance consists of relatively shallow blades 36 secured below the arms in the general zone of operation of stirring element 22b. These blades are preferably disposed at such angles to the arms as to tend to urge settling material outwardly. I have shown chains 37 suspended from the lower edges of blades 36 to serve as supplemental gentle stirring means. Located inwardly of blades 36, and above the arms 21, there are additional blades 38 which are also set at angles adapted to urge material outwardly.

The stirring or raking means described above is capable of improving the action of settlers or thickeners without the use of additional means. I have found however that the operation of my apparatus, or in fact operation of any conventional settling apparatus equipped with a conventional scraper, can be greatly improved by providing resilient baffle elements near the bottom wall of the tank, and functioning to impede and minimize free rotary motion in the lower layer of the tank immediately above the bottom wall 13. Such free rotary motion of the material being treated interferes with the efficient conveying action of the inwardly scraping members, thus reducing the capacity of the apparatus and preventing withdrawal of an underflow dewatered to a desired optimum degree. In the drawings several different types of baffle elements of a resilient form have been shown. Elements 41 consist of flat strips of resilient rubber secured to the bottom of the tank, and extending in a vertical direction. As shown in Figure 2, these baffles can be advantageously disposed at angles opposite to the inclination of the blades 31a and 31b. Also, they may be curved a slight amount to lend rigidity and increase the efficiency of their action. These baffles are located in the zone of operation of the blades 31a and 31b, but because of their resilient form, they are distorted in the manner shown in Figure 4, to permit the blades to pass over the same. The extent of distortion depends upon the nature of the blades 31a or 31b. In case the moving blades are entirely rigid, then the resilient baffles must distort a sufficient amount to pass the blades. Where the blades are provided with resilient extensions as described above, the extensions will likewise distort as shown in Figure 4. In such case the baffle may be rigid. As will be apparent in Figure 2, while a moving blade is passing over a stationary baffle inclined in accordance with the baffles 41, there is a scissors-like action tending to positively expel settled material inwardly to the outlet 14.

In addition to the baffles 41 of extended length, I may provide any number of additional resilient baffles 42, which can likewise be made of resilient rubber.

Operation of the apparatus described above can be outlined as follows. The chamber is continuously supplied with material to be treated through launder 11, the underflow is continuously removed through pipe 15 and pump 16, and an overflow is continuously withdrawn from launder 10. Shaft 18 is driven at a suitable speed such as is ordinarily used in equipment of this kind. The accumulation of settled material upon the bottom 13 of the tank is acted upon by the various stirring and scraping elements. Scraping elements 22a and 22b undercut beneath the lower layer of material. The lower zone of heavy material, held fluid by stirring, moves inward by gravity to replace material which is more positively impelled to the outlet by members 31a and 31b in combination with baffles 41.

This inward flow induced by gravity is accentuated by the inward impelling action of rakes 22a and 22b and by the influx of material into the outer zone of the chamber, caused by the outward propelling action of members 38 and 36 which tend to promote an outward and inward rolling motion of material in the lower zone of the chamber. Chains 27 and 37 and blades 28 and 36 provide a stirring action conducive of maintaining fluidity in, and promoting the settlement of the material in the zone below supporting members 21b and 21c. Also scraping means 22a and 22b do not act upon the thickened material with sufficient force components in the direction of rotation to cause free rotary motion of the material. Furthermore, when treating materials having thixotropic characteristics, the spaced distance of members 22a and 22b beneath the supporting members 21b and 21c prevents material being pushed ahead of 22a and 22b, from building as a heavy load extending upward in front of 21b and 21c and sliding in a rotary direction ahead of the scraping and supporting members.

The baffles 41 and 42 act to prevent rotary motion of material lying on bottom wall 13, and baffles 41, in particular, are effective in increasing the efficiency of the scraper blades in impelling thickened material to the outlet opening. Also the spaced distance of scraping means 22a and 22b below the supporting arms 21b and 21c, in preventing the accumulation of excessive loads of thick material ahead of the supporting arms and scrapers, protects the mechanism from overload strains. As previously pointed out, these factors are important in that the above conditions, rotating thick material, strain on the mechanism, and low efficiency of the blades impelling material to the outlet opening, which are frequently experienced in conventional thickeners, materially interfere with proper settlement and capacity.

I claim:

1. In thickening or settling apparatus, a chamber in which liquid feed material is subjected to settlement, the chamber having a bottom wall and an outlet in its bottom wall for removal of material settled from the liquid feed and also having an overflow liquid outlet, rotary impelling means operating in a circular path in a region near the upper side of the bottom wall and serving to urge settled material toward the outlet, said impelling means including a scraping element moving in said circular path, and a baffle element extending upward from the bottom wall into the path of movement of the scraping element, said baffle element serving to impede rotary movement of settled material in the path of movement of the scraping element, one of said elements being yieldable from a normal position whereby the scraping element can pass the baffle element.

2. In thickening or settling apparatus, a chamber in which liquid feed material is subjected to settlement, the chamber having a bottom wall and an outlet in its bottom wall for removal of material settled from the liquid feed and also having an overflow liquid outlet, rotary impelling means operating in a circular path in a region near the upper side of the bottom wall and serving to urge settled material toward the outlet, said impelling means including a scraping element moving in said circular path, and a baffle element extending upward from the bottom wall into the path of movement of the scraping element, said baffle element serving to impede rotary movement of settled material, said baffle element being resilient.

3. In thickening or settling apparatus, a chamber in which liquid material is subjected to settlement having a feed inlet and an overflow liquid outlet, motor operated rotary inwardly impelling means operating in a region near the bottom wall of the chamber, and a baffle extending upward from the bottom wall of the chamber adapted to interrupt forward sliding movement of the semi-solid viscous material deposited on the bottom of the chamber and impose thereon substantially radial movement.

4. In thickening or settling apparatus, a chamber having a bottom wall in which liquid material is subjected to settlement, the chamber having a feed inlet and an overflow liquid outlet as well as a settled solids outlet located centrally of its bottom wall, motor operated rotary scraping means disposed within the chamber and acting in a region near the lower portion of the chamber, said scraping means serving to cause settled material to be impelled toward the outlet, and resilient baffle means extending above the bottom wall in the path of movement of the scraping means, said baffle means serving to impede free rotary movement of settled material along the path of the scraping means.

5. In thickening or settling apparatus, a tank in which liquid material is subjected to settlement, the tank being provided with a feed inlet and an overflow liquid outlet as well as an outlet centrally of its bottom wall, motor operated rotary scraping means disposed within the tank and serving to urge settled material toward the outlet, and resilient baffles fixed to the bottom wall extending upwardly from the same, said baffles being formed of resilient rubber and disposed in the path of movement of the scraping means.

6. In thickening or settling apparatus, a tank in which material is subjected to settlement, the tank being provided with a feed inlet and an overflow liquid outlet as well as an outlet centrally of its bottom wall, motor operated rotary scraping means disposed above the bottom wall and serving to urge said material toward the outlet, said scraping means consisting of at least one blade disposed at such an angle as tends to urge settling material inwardly, and at least one resilient baffle extending upwardly from the bottom wall in the path of movement of said blade, said baffle being disposed at an angle opposite to that of the blade and serving to cooperate with the blade to urge material inwardly.

7. In thickening or settling apparatus, a tank in which material is treated to quiescent sedimentation, the tank being provided with a feed inlet and an overflow liquid outlet as well as a central outlet in its bottom wall for deposited material, motor operated rotary sediment scraping means disposed within the outlet above the bottom wall and including at least one blade advanced at an angle against deposited material thereby urging the material inwardly toward the outlet, and at least one baffle formed of resilient material mounted upon the bottom wall and extending upwardly from the bottom wall in the path of movement of said blade, said baffle being disposed at an angle opposite to that of the blade and cooperating with the blade scissors fashion to positively urge deposited material inwardly toward the outlet while interrupting forward sliding mass movement of viscous sediment on the tank bottom.

8. In thickening or settling apparatus, a tank in which liquid material is subjected to settlement, the tank being provided with a feed inlet and an overflow liquid outlet as well as an outlet centrally of its bottom, motor operated rotary scraping means disposed within the tank and operating in a zone above the bottom wall, said scraping means including relatively narrow elements adapted to undercut settling material in the outer zone of the tank, rotatable supporting members disposed above said scraping means and connected thereto, and blades likewise supported by said supporting members and located a substantial distance above said scraping means, said blades being set at angles tending to urge settling material outwardly and serving to cause a cleavage of material in a region located above the zone of operation of said scraping means.

9. In a thickening apparatus including a chamber in which liquid material is subjected to settlement, said chamber being provided with a feed inlet and an overflow liquid outlet as well as a centrally located outlet in its bottom wall and means adapted to impel thickened material to the outlet; said means including motor operated rotatable supporting arms positioned in the lower part of said chamber at a spaced distance above the bottom wall and extending outward from said outlet, scraping members attached to said arms adapted to engage thickened material lying in contact with said bottom wall, said scraping members including relatively narrow outer scraping members and relatively broad inner scraping members, means adapted to position said outer scraping members at a substantial distance below said supporting arms, and members supported by and extending downward from said supporting arms, said members being adapted to stir material in the region between the supporting arms and the scraping members.

HARRISON S. COE.